T. H. MILLER.
SHOCK ABSORBING PULLEY.
APPLICATION FILED OCT. 21, 1909.

981,869.

Patented Jan. 17, 1911.

WITNESSES:

INVENTOR
Theodore H. Miller
BY
ATTORNEYS.

UNITED STATES PATENT OFFICE.

THEODORE H. MILLER, OF POUGHKEEPSIE, NEW YORK, ASSIGNOR TO THE DE LAVAL SEPARATOR COMPANY, A CORPORATION OF NEW JERSEY.

SHOCK-ABSORBING PULLEY.

981,869.  Specification of Letters Patent.  Patented Jan. 17, 1911.

Application filed October 21, 1909. Serial No. 523,833.

*To all whom it may concern:*

Be it known that I, THEODORE H. MILLER, a citizen of the United States, residing at Poughkeepsie, county of Dutchess, and State of New York, have invented a new and useful Improvement in Shock-Absorbing Pulleys, of which the following is a full, clear, and exact description, reference being had to the accompanying drawings, which form a part of this specification.

My invention is particularly designed for use with a gas engine where the explosion has a tendency to vary the impulse or drive. If the pulley be fixedly attached to the shaft driven by such an engine it will have a tendency to produce irregularity of movement and a jarring. When, as is the case here, I desire to drive a centrifugal separator this condition should be avoided.

It is the object of my invention to correct this defect. The mechanism by which I accomplish this result can be best described by reference to the embodiments of my invention shown in the accompanying drawings, in which—

Figure 1:
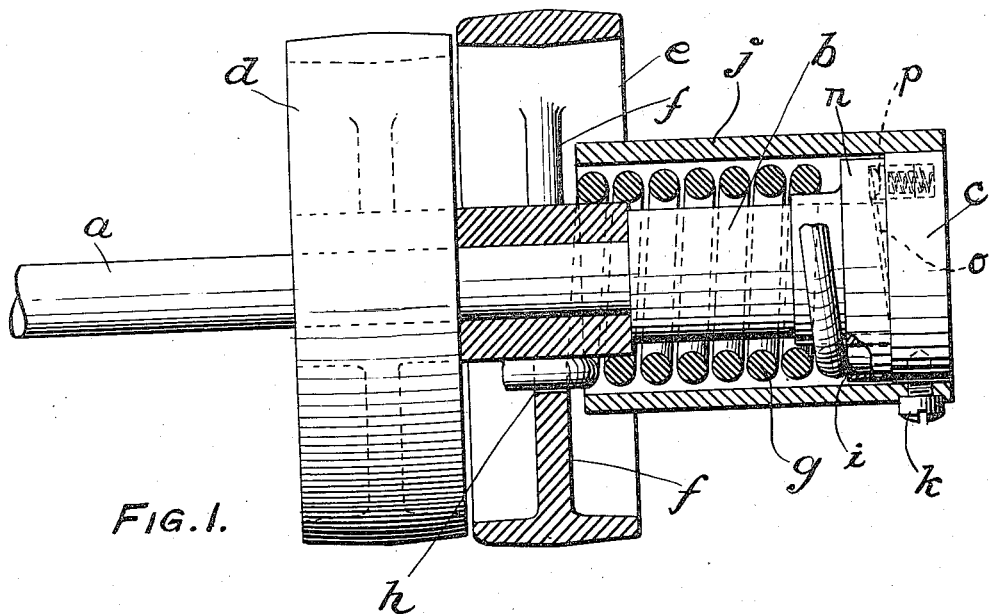
Figure 2:
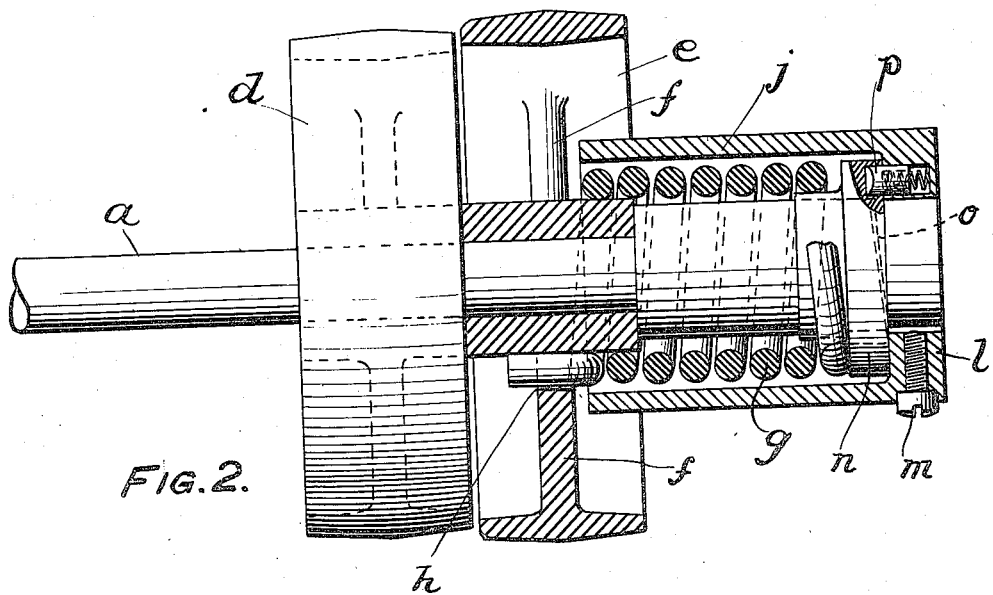

Figure 1 is a sectional view of an apparatus showing one embodiment of my invention. Fig. 2 is a sectional view of an apparatus showing another embodiment of my invention.

Referring to Fig. 1, *a* is the shaft driven by a gas engine, not shown. This shaft has the enlarged portion *b* and the enlarged head or end *c*. *d* is the idle pulley. *e* is the driving pulley in spider form, having the webs *f*. This pulley is loosely mounted on the shaft *a*. It is connected to be driven by the shaft in the following manner: Coiled around the enlarged portion *b* of the shaft *a* is the spring *g*; one end of this spring enters an orifice *h* in one of the webs *f* and the other end of the spring enters an orifice *i* in the collar *n* loose on the shaft *a*. Milled on the side of the collar is the ratchet cam *o*. *p* is a spring pawl mounted on the head and coöperating with the ratchet cam *o*. *j* is a sleeve surrounding the spring *g*. This sleeve is secured to the head by the set screw *k*.

The construction shown in Fig. 2 is quite similar to that shown in Fig. 1. The shaft *a*, however, does not have a head *c* as in Fig. 1, but the sleeve *j* has an end piece *l* which, when the sleeve is in position, fits over the end of the shaft and on which is secured the pawl *p*, and forms a head for the shaft. In this construction the sleeve *j* is secured to the enlarged portion *b* of the shaft *a* by set screw *m*.

When the shaft is operated by the gas engine, the shaft *a* and driving pulley *e* are operated with regularity and all shock is absorbed. When the gas engine is stopped with the belt upon the driving pulley and operating, say, a separator, the driving pulley through the ratchet and pawl connection can continue to rotate until its momentum ceases.

Having now fully described my invention, what I claim and desire to protect by Letters Patent is:

1. In combination, a driving shaft, a pulley loose on said shaft, a ratchet and pawl driving connection for said shaft, and a spring connection between said pulley and said ratchet and pawl driving connection to communicate the movement of the shaft to the pulley.

2. In combination, a driving shaft, a pulley loose on said shaft, a driving connection for said shaft, operative to rotate the shaft, and a spring connection between said pulley and said shaft driving connection to communicate said movement to the pulley.

3. In combination, a driving shaft, a pulley having an orifice, a spring surrounding a portion of said shaft, a collar loose on said shaft, said spring being connected with said collar and entering said pulley orifice, and a ratchet and pawl connection between said collar and shaft.

4. In combination, a driving shaft, a pulley having an orifice, a spring surrounding a portion of said shaft, said spring entering said pulley orifice, a connection between said spring and shaft, and a sleeve surrounding said spring, said sleeve being secured to said shaft.

5. In combination, a driving shaft, a pulley loosely mounted on said shaft, said shaft beyond said pulley being enlarged, a spring surrounding said enlarged portion, said spring forming a connection between said pulley and shaft.

6. In combination, a driving shaft, a pulley loosely mounted on said shaft, said shaft beyond said pulley having a head, a spring surrounding said shaft, said spring forming a connection between said pulley and shaft.

7. In combination, a driving shaft, a pulley loosely mounted on said shaft, said shaft beyond said pulley having an enlarged portion and a head, a spring surrounding said enlarged portion, said spring forming a connection between said pulley and shaft.

8. In combination, a driving shaft, a pulley loosely mounted on said shaft, said shaft beyond said pulley being enlarged, a spring surrounding said enlarged portion, said spring forming a connection between said pulley and shaft, a sleeve surrounding said spring and secured to said shaft.

9. In combination, a driving shaft, a pulley loosely mounted on said shaft, said shaft beyond said pulley having a head, a spring surrounding said shaft, said spring forming a connection between said pulley and shaft, and a sleeve surrounding said spring and secured to said shaft.

10. In combination, a driving shaft, a pulley loosely mounted on said shaft, said shaft beyond said pulley having an enlarged portion and a head, a spring surrounding said enlarged portion, said spring forming a connection between said pulley and head, and a sleeve surrounding said spring and secured to said shaft.

11. In combination, a driving shaft, a pulley loosely mounted on said shaft, said pulley having an orifice, a head, a collar loose on said shaft having an orifice, a spring surrounding said shaft, said spring entering the pulley and collar orifices, and a ratchet and pawl connection between said head and collar.

12. In combination, a driving shaft, a pulley loosely mounted on said shaft, said pulley having an orifice, a head, a collar loose on said shaft, there being an orifice in said collar, a spring surrounding said shaft, said spring entering the pulley and collar orifices, a sleeve surrounding said spring, said sleeve being secured to said shaft, and a ratchet and pawl connection between said head and collar.

13. In combination, a driving shaft, a pulley loosely mounted on said shaft, said pulley having an orifice, said shaft, beyond said pulley, having an enlarged portion, a head, a collar loose on said shaft, there being an orifice in said collar, a spring surrounding the enlarged portion of said shaft, said spring entering the pulley orifice and collar orifices, and ratchet and pawl connection between said collar and head.

14. In combination, a driving shaft, a pulley loosely mounted on said shaft, said pulley having an orifice, said shaft, beyond said pulley, having an enlarged portion, said shaft having a head, a collar loose on said shaft, there being an orifice in said collar, a spring surrounding the enlarged portion of said shaft, said spring entering the pulley orifice and collar orifice, and a sleeve surrounding said spring, said sleeve being secured to said shaft, and a ratchet and pawl connection between said collar and head.

15. In combination, a driving shaft, a pulley loosely mounted on said shaft, said shaft having a head, a collar loose on said shaft, a spring forming a driving connection between said pulley and said collar, and loose connection between said head and said collar.

16. In combination, a driving shaft, a pulley loosely mounted on said shaft, said shaft having a head, a collar loose on said shaft, a spring surrounding said shaft and forming a driving connection between said pulley and said collar, a sleeve surrounding said spring, and loose connection between said collar and said head.

17. In combination, a driving shaft, a pulley loosely mounted on said shaft, said shaft having a head, a collar loose on said shaft, a spring forming a driving connection between said pulley and said collar, said collar and pulley each having an orifice, said spring entering said orifices, and a ratchet and pawl connection between said head and collar.

18. In combination, a driving shaft, a pulley loosely mounted on said shaft, said shaft having a head, a collar loose on said shaft, a spring surrounding said shaft between said pulley and said collar, said collar and pulley each having an orifice, said spring entering said orifices, and a sleeve surrounding said spring and secured to said shaft, and ratchet and pawl connections between said head and collar.

19. In combination, a driving shaft, a pulley, a driven member, and spring connection between said pulley and driven member for directly driving the latter, and loose connection between said driven member and said shaft for driving said shaft.

In testimony of which invention, I have hereunto set my hand, at Poughkeepsie, N. Y., on this 11th day of Oct., 1909.

THEODORE H. MILLER.

Witnesses:
FRANK R. COUNS,
JOHN B. GRUBB.